(12) United States Patent
Buabbud

(10) Patent No.: US 7,103,907 B1
(45) Date of Patent: Sep. 5, 2006

(54) RF RETURN OPTICAL TRANSMISSION

(75) Inventor: George H. Buabbud, Southlake, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 895 days.

(21) Appl. No.: 09/633,320

(22) Filed: Aug. 7, 2000

Related U.S. Application Data

(63) Continuation-in-part of application No. 09/309,717, filed on May 11, 1999.

(51) Int. Cl.
*H04N 7/173* (2006.01)

(52) U.S. Cl. ...................... 725/129; 725/121

(58) Field of Classification Search ............. 725/105, 725/106, 118, 119, 121, 122, 126, 127, 129
See application file for complete search history.

(56) References Cited

U.S. PATENT DOCUMENTS

| | | | |
|---|---|---|---|
| 4,058,672 A | 11/1977 | Crager et al. |
| 4,408,323 A | 10/1983 | Montgomery |
| 4,476,559 A | 10/1984 | Brolin et al. |
| 4,491,983 A | 1/1985 | Pinnow et al. |
| 4,534,024 A | 8/1985 | Maxemchuk et al. |
| 4,577,314 A | 3/1986 | Chu et al. |
| 4,592,048 A | 5/1986 | Beckner et al. |
| 4,686,667 A | 8/1987 | Ohnsorge |
| 4,730,311 A | 3/1988 | Carse et al. |
| 4,763,317 A | 8/1988 | Lehman et al. |
| 4,768,188 A | 8/1988 | Barnhart et al. |
| 4,771,425 A | 9/1988 | Baran et al. |
| 4,787,693 A | 11/1988 | Kogelnik et al. |
| 4,881,225 A | 11/1989 | Dyke et al. |
| 4,888,765 A | 12/1989 | Dyke |
| 4,891,694 A | 1/1990 | Way |
| 4,903,292 A | 2/1990 | Dillon |
| 4,962,497 A | 10/1990 | Ferenc et al. |
| 4,967,193 A | 10/1990 | Dyke et al. |
| 5,014,266 A | 5/1991 | Bales et al. |
| 5,022,752 A | 6/1991 | BuAbbud |
| 5,046,067 A | 9/1991 | Kimbrough |
| 5,136,411 A | 8/1992 | Paik et al. |
| 5,142,532 A | 8/1992 | Adams |
| 5,193,110 A | 3/1993 | Jones et al. |
| 5,202,780 A | 4/1993 | Fussanger |
| 5,247,347 A | 9/1993 | Litteral et al. |
| 5,263,081 A | 11/1993 | Nightingale et al. |
| 5,267,122 A | 11/1993 | Glover et al. |
| 5,287,344 A | 2/1994 | Bye et al. |

(Continued)

FOREIGN PATENT DOCUMENTS

EP 0499065 8/1992

(Continued)

OTHER PUBLICATIONS

Masakazu Kitazawa, MasatoshiYamazaki, Susumu Hiti, "Fiber-Optic Subscriber System Based on Passive Optical Network Architecture," Hitachi Review vol. 43 (1994). No. 2.

(Continued)

*Primary Examiner*—Vivek Srivastava
(74) *Attorney, Agent, or Firm*—Baker Botts L.L.P.

(57) ABSTRACT

A method of transmitting TV signals and bidirectional telephone communication signals on a single optical fiber, existing telephone twisted pair infrastructure, and existing coaxial cable infrastructure. In addition to allowing the downstream transmission of television channels as well as bidirectional telephone communication, the single optical fibers also provides for the upstream travel of television related signals while requiring minimal changes of the existing infrastructure.

9 Claims, 6 Drawing Sheets

U.S. PATENT DOCUMENTS

| | | | |
|---|---|---|---|
| 5,303,229 A | 4/1994 | Withers et al. |
| 5,325,223 A | 6/1994 | Bears |
| 5,341,374 A | 8/1994 | Lewen et al. |
| 5,349,457 A | 9/1994 | Bears |
| 5,351,148 A | 9/1994 | Maeda et al. |
| 5,355,362 A | 10/1994 | Gorshe et al. |
| 5,381,405 A | 1/1995 | Daugherty et al. |
| 5,383,180 A | 1/1995 | Kartalopoulos |
| 5,398,129 A | 3/1995 | Reimann |
| 5,421,030 A | 5/1995 | Baran |
| 5,463,616 A | 10/1995 | Kruse et al. |
| 5,469,282 A | 11/1995 | Ishioka |
| 5,479,286 A | 12/1995 | Stalley et al. |
| 5,491,797 A | 2/1996 | Thompson et al. |
| 5,499,241 A | 3/1996 | Thompson et al. |
| 5,500,753 A | 3/1996 | Sutherland |
| 5,504,606 A | 4/1996 | Frigo |
| 5,526,350 A | 6/1996 | Gittins et al. |
| 5,526,353 A | 6/1996 | Henley et al. |
| 5,539,564 A | 7/1996 | Kumozaki et al. |
| 5,544,163 A | 8/1996 | Madonna |
| 5,544,164 A | 8/1996 | Baran |
| 5,546,483 A | 8/1996 | Inoue et al. |
| 5,553,311 A | 9/1996 | McLaughlin et al. |
| 5,555,244 A | 9/1996 | Gupta et al. |
| 5,566,239 A | 10/1996 | Garcia et al. |
| 5,572,347 A | 11/1996 | Burton et al. |
| 5,579,328 A | 11/1996 | Habel et al. |
| 5,586,121 A | 12/1996 | Moura et al. |
| 5,594,734 A | 1/1997 | Worsley et al. |
| 5,600,469 A | 2/1997 | Yamazaki |
| 5,608,565 A | 3/1997 | Suzuki et al. |
| 5,617,423 A | 4/1997 | Li et al. |
| 5,623,490 A | 4/1997 | Richter et al. |
| 5,640,387 A | 6/1997 | Takahashi et al. |
| 5,680,238 A | 10/1997 | Masuda |
| 5,729,370 A | 3/1998 | Bernstein et al. |
| 5,742,414 A | 4/1998 | Frigo et al. |
| 5,742,596 A | 4/1998 | Baratz et al. |
| 5,761,307 A | 6/1998 | Mohrmann et al. |
| 5,784,377 A | 7/1998 | Baydar et al. |
| 5,808,767 A | 9/1998 | Williams et al. |
| 5,842,111 A | 11/1998 | Byers |
| 5,854,702 A | 12/1998 | Ishikawa et al. |
| 5,861,966 A | 1/1999 | Ortel |
| 5,864,413 A | 1/1999 | Feldman et al. |
| 5,864,415 A | 1/1999 | Williams et al. |
| 5,870,395 A | 2/1999 | Baran |
| 5,872,645 A | 2/1999 | Proctor |
| 5,880,864 A | 3/1999 | Williams et al. |
| 5,880,865 A | 3/1999 | Lu et al. |
| 5,912,998 A | 6/1999 | Quayle |
| 5,930,015 A | 7/1999 | Yamamoto et al. |
| 5,956,168 A | 9/1999 | Levinsen et al. |
| 5,969,836 A | 10/1999 | Foltzer |
| 5,995,491 A | 11/1999 | Richter et al. |
| 6,031,645 A | 2/2000 | Ichikawa |
| 6,061,481 A | 5/2000 | Heidrich et al. |
| 6,144,473 A | 11/2000 | Rokhsaz et al. |
| 6,163,537 A * | 12/2000 | Thacker ............ 370/352 |
| 6,181,867 B1 * | 1/2001 | Kenner et al. ........ 386/46 |
| 6,262,997 B1 | 7/2001 | Quayle |
| 6,288,809 B1 | 9/2001 | Touma et al. |
| 6,317,234 B1 | 11/2001 | Quayle |
| 6,356,736 B1 | 3/2002 | Tomasz et al. |
| 6,411,410 B1 | 6/2002 | Wright et al. |
| 6,493,335 B1 | 12/2002 | Darcie et al. |
| 6,552,832 B1 | 4/2003 | Beierle et al. |
| 6,577,414 B1 | 6/2003 | Feldman et al. |
| 6,628,771 B1 | 9/2003 | Frise et al. |
| 6,633,635 B1 | 10/2003 | Kung et al. |
| 6,771,909 B1 | 8/2004 | Farhan et al. |
| 2001/0030977 A1 | 10/2001 | May |

FOREIGN PATENT DOCUMENTS

| | | |
|---|---|---|
| EP | 0593947 | 4/1994 |
| EP | 0690591 | 1/1996 |
| EP | 0690591 A1 | 1/1996 |
| EP | 789470 | 8/1997 |
| EP | 829995 | 3/1998 |
| JP | 09284231 | 10/1997 |
| WO | WO 91/15064 | 10/1991 |
| WO | WO 9115064 | 10/1991 |
| WO | WO 9505041 | 2/1995 |
| WO | WO 98 34379 | 8/1998 |
| WO | WO 00/69104 | 11/2000 |
| WO | WO 0069104 | 11/2000 |

OTHER PUBLICATIONS

Boettle, Dietrich and Haisch, Hansjorg "Hybrid Fiber Radio Access Networks: Architecture, Potential and Evolution", Broadband Access and Technology, D.W. Faulkner and A.L. Harmer (Eds.), IOS Press. 1999 AKM, pp. 239-244.

Boettle, Dietrich and Haisch, Hansjorg, "Hybrid Fiber Radio Access Networks: Architecture Potential and Evolution", Broadband Access and Technology, D.W. Faulkner and A.L. Harmer (Eds.)., IOS Press, 1999 AKM, pp. 239-244.

DeTreville, J.D., "A Simulation-Based Comparison of Voice Transmission on CSMA/CD Networks and on Token Buses", AT&T Bell Laboratories Technical Journal, vol. 63, No. 1, Jan. 1984, pp. 33-56.

Ishikawa et al., "A New Polarization-Independent LinB03 Waveguide Optical Modulator for Bidirectional Transmission in Optical Catv Subscriber Systems", Proceedings of the European Conference on Optical Communication (ECOC), Frankfurt, Germany, vol. Conf. 18, Sep. 27, 1992, pp. 293-296.

Masakaza Kitazawa, Masatoshi Yamazaki, Susumu Hiti, "Fiber-Optic Subscriber System Based on Passive Optical Network Architecture", Hitachi Review, vol. 43 (1994), No. 2.

Montgomery, Warren A., "Techniques for Packet Voice Synchronization", vol. Sac-1, No. 6, Dec. 1983, pp. 1022-1028, IEEE Journal on Selected Areas in Communications.

Perlman, R., "Interconnections: Bridges and Routers", Addison-Wesley, 1992, p. 36.

* cited by examiner

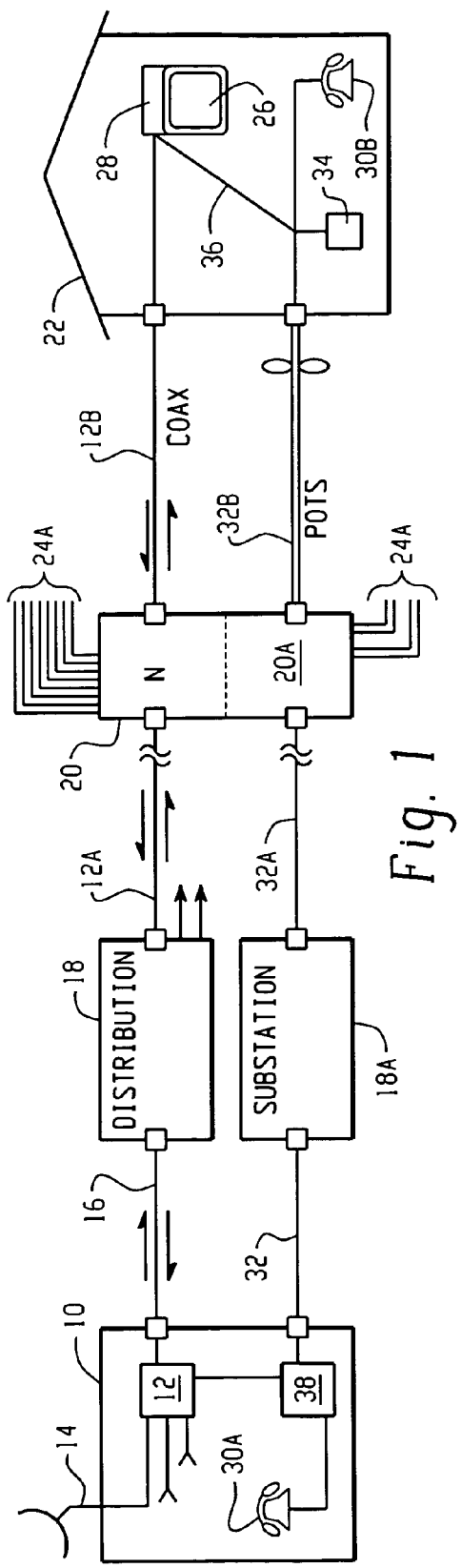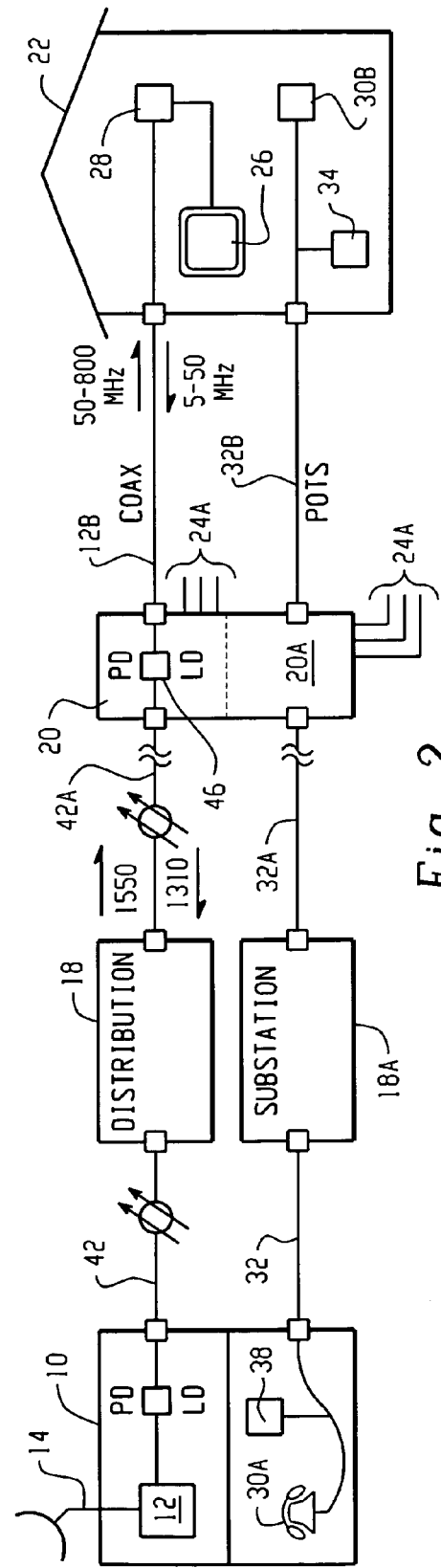

RF RETURN OPTICAL TRANSMISSION

CROSS-REFERENCES TO RELATED APPLICATIONS

This is a continuation-in-part application of Ser. No. 09/309,717 filed May 11, 1999, and having the same title and the same inventor as the present application.

BACKGROUND OF THE INVENTION

1. Field of the Invention

The present invention relates to methods and apparatus for carrying on simultaneous communications over a single optical fiber by using two different operating frequencies, and more specifically to methods and apparatus for use with WDM (wave division multiplexing) at two different wavelengths of light to provide bidirectional telephonic communication using TDM (time division multiplexing) at one wavelength of light and transmitting TV signals in only one direction (downstream) at another wavelength. TV control signals are returned by the telephonic communication path to the TV source by multiplexing the control signals with the telephonic signals.

2. Description of Related Art Including Information Disclosed Under 37 CFR 1.97 and 1.98

The communications industry is using more and more optical or light fibers in lieu of copper wire. Optical fibers have an extremely high bandwidth thereby allowing significantly more information than can be carried by a copper wire transmission line such as twisted pairs or coaxial cable.

Of course, modern telephone systems require bidirectional communications where each station or user on a communication channel can both transmit and receive. This is true, of course, whether using electrical wiring or optical fibers as the transmission medium. Early telephone communication systems solved this need by simply providing separate copper wires for carrying the communications in each direction, and this approach is still used in part of the transmission path. It is especially used as the signals get closer to the end users. Although twisted pairs and coaxial cables are used in homes and distribution terminals close to the home end user, some modern telecommunication systems now use micro-wave and optic fibers as transmission mediums. In addition TCM (time compression multiplexing) is often used in optical transmission so that a signal optical fiber can carry communications in both direction.

However, because of extremely high band widths available for use by an optical fiber, a single fiber is quite capable of carrying a great number of communications in both directions. One technique of optical transmission is WDM (wavelength divisional multiplexing) and uses different wavelengths for each direction of travel.

Yet another and simpler technique for using a single optical fiber for telephone systems is TCM (time compression multiplexing) and is sometimes referred to as a "ping-pong" system. The system operates at a single frequency or wavelength of light and uses a single optical fiber and often even a single diode, for both converting electrical signals to optical signals and converting received optical signals to electrical signals. TCM systems have the obvious advantage of requiring fewer components.

However, as mentioned above, optical fibers have extremely high band widths and use of an optical fiber for a single ping-pong telephone channel is a very ineffective use of the fiber and, in fact, the available bandwidth of an optical fiber makes it possible to use a transmission technique such as TCM or ping-pong at one frequency and then by the use of WDM technology to use another technique at a second frequency.

Another area of rapidly growing technology is providing unidirectional TV signals by cable to a multiplicity of subscribers or users. In the past, such signals were and still are typically transmitted by the use of coaxial cables (e.g. cable TV). However, the use of optical fibers for transmission allows broad band transmission to a large numbers of customers and, since substantially all of the transmission of TV signals is one way (i.e. unidirectional), if a single optical fiber were used solely for the TV signals there would be almost no use of the selected wavelength of light for carrying return signal, which are typically control or information signals.

Therefore, a technique for transmitting bidirectional telephony signals and unidirectional TV signals would make efficient use of an optical fiber.

It would also be advantageous to provide return control signals to the TV signal source or station with respect to each customer or subscriber without having to dedicate a frequency or wavelength of light full time to said seldom used or RF Return transmitted signals.

SUMMARY OF THE INVENTION

The above objects and advantages are achieved in the present invention by methods and apparatus which comprise transmitting light at a first wavelength to carry telephony signals between a first telephone-related device and a second telephone-related device, or location and also transmitting light at a second wavelength to carry TV signals from a TV signal source to an end user(s). The wavelengths or light are carried through a single optical fiber from a first-end to a second-end. The first and second wavelengths of light are received at the second-end of the optical fiber, and the signals on the first wavelength of light are detected and converted to first electrical signals at a first frequency band suitable for carrying telephony signals such as voice telephone and computer modem signal, at a frequency band of about 64 KHz or less. The received second wavelength of light is also detected, and the detected light is converted to RF electrical signals, within a second overall frequency band. The overall frequency band typically extends between 5 and 870 MHz, where frequencies between 50 and 870 MHz are representative of TV channel signals and frequencies between 5 and 50 MHz are referred to as return RF signals. The return RF signals may include cable modem signals, set-top box signals and other TV related signals from a subscriber or user. The telephony electrical signals are transmitted to a receiving telephone or other telephone-related device and the electrical signals representative of TV signals are transmitted to a TV signal receiving device. The return electrical telephony signals are then generated at the receiving telephone-related device at the same frequency band the original telephony signal were transmitted and are representative of return telephone information which could be 56K telephone modem information or voice information. The RF return signals including cable modem signals, TV related electrical signals such as control signals, information signals or TV show ordering signals are generated at a third frequency band. The return electrical telephony signal at the first frequency band of about 64 HKz and the RF return electrical signals generated at about 5 to 50 MHz are combined. The combined electrical signals are converted to light signals at the first wavelength which carries both the return telephony signal and the RF return signals. The light at the first wavelength is transmitted through the single optical fiber from the second end to the first end where it is received and detected such that electrical signals representative of both the return telephony signals and the electrical signal representative of the TV related information or other RF return signals are generated. The return electrical telephony signals are transmitted to the first telephone-related device and the electrical TV related signals are transmitted to the TV signal source.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which:

FIG. 1 is a prior art block diagram showing the present transmission and distribution of a typical coaxial TV and POTS telephone system;

FIG. 2 shows a POTS telephone system and a fiber optic TV distribution system having 1550 nanometer light carrying TV signals in one direction and 1310 nanometers of light carrying telephony signals in both directions;

DETAILED DESCRIPTION OF THE PREFERRED EMBODIMENT(S)

Figure 3:
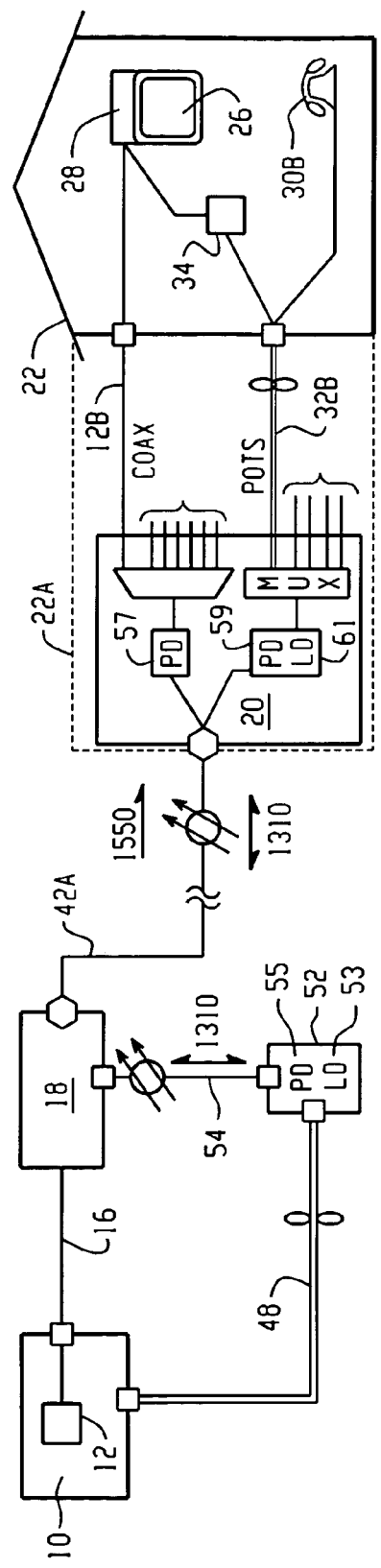
FIG. 3 shows a block diagram of a preferred embodiment of the present invention incorporating portions of the existing POTS telephone system and the coaxial TV signal distribution system while using a single optical fiber for carrying the TV signals at 1550 nanometers of light downstream and the telephony signals in both directions at 1310 nanometers.

Referring now to FIG. 1, there is shown a typical transmission and distribution system for cable TV and normal telephone service, referred to as POTS (plain old telephone service). As shown, cable TV source location 10 has cable TV transmission equipment 12 which may originate from several sources including a satellite receiver 14. The TV equipment 12 would then amplify this signal and send it out typically on a coaxial line such as line 16 to a distribution system which may include several stations such as station 18 where the signal is again amplified and further distributed to an even larger multiplicity of locations. Such re-amplification and further distribution may occur several times but eventually will arrive at a local distribution terminal 20 by means of a coaxial cable 12A from which it is then distributed to a home or building 22 by a coaxial cable 12B. As shown distribution terminal 20 may also provide TV signals to other buildings or homes such as indicated by bracket 24. Once the TV signal is received at building 22, it will then typically be provided to a TV set 26 directly or to a set-top or cable TV box 28. If the signal is first provided to the set-top box 28, it is then directly provided to TV set 26. It should be appreciated that the direction of travel for such signals is primarily unidirectional and downstream. That is, it travels primarily from the cable TV signal source 10 to the set-top box 28 in the building or home 22 at frequencies within a frequency band of between 5–870 MHz, and which TV channels have frequencies of between 50–870 MHz. If information is to be carried upstream or back to source 10, it will typically be at between 50–200 MHz.

Also shown is a typical telephone system or POTS which of course is two-way communication typically carried by means of a twisted pair of wires. In the example shown in FIG. 1, if someone at the cable TV signal source location 10 wishes to talk with someone at building 22, the telephone 30A is used in its normal manner. The two-way conversation is carried on between the person in building 10 using telephone 30A and by a person using telephone 30B in the home or building 22. This communication is typically carried through a pair of twisted wires such as indicated by 32, 32A, and 32B. In recent years, the regular telephone distribution system has also been used to provide communications between computers. This is done by the use of a modem 34 which connects a computer to the telephone line. As was the case with the TV signal distribution, there are typically several stations or substations such as substation 18A between the two telephones 30A and 30B located at the building 10 and the building 22, respectively. Such distribution terminals or stations allow telephone services between all subscribers with which we are all well aware. However, as shown in portion 20A of distribution terminal 20, there may also be several other buildings or homes connected to telephone distribution terminal 20 as indicated by bracket 24A. As was discussed earlier, communications between buildings 10 and 22 were typically accomplished through regular telephone service by individuals talking to each other. However with more efficient automation, telephone lines may also be connected up to the set-top box 28 as indicated by wires 36. In addition, in the distribution terminal 38 at the cable TV signal location, there is also a telephone connection to the TV signal equipment 12, such that it is now possible that movies or information concerning the TV signals and TV equipment can be communicated between the two locations.

As demands increase for more and more TV channels and better and more efficient transmission techniques without disruption and interference, the long runs of coaxial cable are simply becoming inefficient and inadequate. Thus as is shown in FIG. 2, there is an improved system for the transmission of TV signals between the TV signal source location 10 and the building or home 22. In the systems shown in FIG. 2, there is also shown a standard telephone or POTS system as discussed above.

In the improved television transmission system, however, the transmission is achieved by a fiber optical cable as indicated by fiber optical cables 42 and 42A. As shown in FIG. 2, the same coaxial cable 12B exist between the distribution terminal 20 and the home of building 22. However, also as shown distribution terminal 20 includes new equipment 46 which receives the light transmitted on fiber optic 42 and converts it to electrical signals and conversely receives electrical signals from 12B and converts the electrical signals to light signals for transmission on fiber optic 42A. However as will be appreciated by those skilled in the art, the TV signals from the TV signal source building 10 normally travel downstream only and are continuous. Thus, if bidirectional communications between the cable TV signal source 10 and the distribution terminal 20 are to take place, some sort of sharing of the individual fiber optics 42 and 42A as well as the copper wire 12B must be provided. Thus, in the example shown, the TV signals travel in a single direction (i.e., downstream) from the TV signal source at location 10 to the home or building 22 by light waves having a length of at 1550 nanometers. Any return communication traveling on optical fibers 42 and 42A must be carried at a different wavelength of light such as 1310 nanometers which travels upstream to the TV signal source location 10. Likewise, if bidirectional communication is to take place on the single coaxial cable 12B between distribution terminal 20 and home or building 22, the transmission of such bidirectional communication transmission will be at different frequencies. Thus, in the illustrated example, the 1550 nanometer light waves will be converted to electrical signals having a frequency band of between about 50 and 800 MHz which travel in a single direction from distribution terminal 20 to a multitude of homes or buildings 22. The return signals from a cable modem or set-top box at building 22 are then carried at about 5 to 50 MHz back to the distribution terminal 20 and then used to modulate light waves having a wavelength of 1310 nanometers. Thus, it is seen that it is possible by the use of a single fiber optic cable as well as using existing infrastructure copper wiring such as coaxial cable to transmit a broad frequency band of TV signals carrying multiple channels of TV information at one wavelength of light. The individual TV channels are then converted to electrical signals at a specific frequency within a selected frequency band, such as for example, only the 50–800 MHz frequency band. Conversely, electrical control or RF return signals within the 5–50 MHz frequency band are converted to light at a wavelength different from that provided in the downstream mode and transmitted back to the TV signal source location 10. The return wavelength of light in the illustrated example is 1310 nanometers.

Referring now to FIG. 3 there is shown a simplified block diagram of the overall operation of the present invention which takes partial advantage of the existing telephone and coaxial TV distribution systems while also using a single optical fiber. 42A for part of the bidirectional telephone transmission (POTS) as well as part of the transmission path between the TV signal source location 10 and the building or home 22. It should be noted that, although the following discussion is in terms of a single direct path for the coaxial and optical fiber cable 42A between two locations 10 and 22, in actuality there will be a significant amount of multiplexing and de-multiplexing such that many, many subscribers or customers may be serviced by the single optical fiber and other multiplexed cables. It should also be noted that there may also be several amplification stations located at various locations in the distribution path.

Further, as is shown, in addition to the optical fiber 42A traveling between distribution terminal 18 and a remote distribution terminal 20, there will be other optical fibers as indicated by optical fibers 42B through 42E which extend between distribution terminal 18 and other remote distribution terminal (not shown) similar to remote distribution terminal 20. Each of the optical fibers 42B through 42E carry light at both 1550 nanometer and 1310 nanometer. However, as will be discussed in more detail later, the different optical fibers may vary substantially in length such that the optical power losses for each fiber may be significantly different.

As shown, TV signal source location 10 provides signals from equipment 12 and, in this illustrated embodiment, the TV signals may be 50 to 870 MHz signals provided on copper wire, such as coaxial cable 16. Copper coaxial cable 16 carries the TV signals having a band width of 50 to 870 MHz to a distribution terminal 18 which uses the electrical TV signals to modulate light having a selected wavelength. In one preferred embodiment a particular selected wavelength is 1550 nanometers. Thus the light waves are provided to each of the individual optical fibers 42A–42E and travel in a single direction from distribution terminal 18 to an equal number of remote terminals, such as distribution terminal 20. As mentioned above, however, the various optical fibers 42A–42E may vary substantially in length. Also as shown, electrical telephony signals may be carried by copper wires such as copper wires 48 which represent a twisted pair of normal telephone communication wires to a substation 52 where electrical telephony signals traveling downstream are used to modulate light at a selected frequency (typically by a laser diode—(LD) 53). In the same manner, light at that same frequency traveling upstream previously modulated by electrical telephony signals is processed to recover or detect (typically by a photo detector—(PD) 55) the telephony signals. Thus, the fiber optic cable 54 shown between distribution terminals 18 and substation 52 carries telephony signals at a single wavelength of light typically selected to be about 1310 nanometers. The light signals at 1310 nanometers are able to travel in both directions on the single fiber optic cable 54 by the use of TCM (time compression multiplexing). Although TCM is not normally suitable for higher density signals such as TV signals, it is quite adequate for lower frequencies suitable for transmitting the human voice as well as frequencies up to about 50 to 64 MHz, which is well above human hearing. Time compression multiplexing simply stated means that time is continuously broken up in substantially two portions or cycles such that signals travel in one direction during one portion and in the opposite direction during the other portion. Also as shown and as was discussed above with respect to optical fibers 42A through 42E, there will be a plurality of additional optical fibers 54A through 54D also carrying many other telephony signals by TCM at 1310 nanometers.

Thus, distribution terminal 18 receives fiber optic cable 54 along with fiber optic cables 54A through 54D, each carrying the 1310 TCM (time compression multiplexed) modulated light and also receives 50 to 870 MHz TV signals from the TV signal source location 10. The 50 to 870 MHz electrical signals are used to modulate light having a wavelength of 1550 nanometers. Distribution terminal 18 then combines by WDM (wave division multiplexing) the plurality of 1310 nanometer signals along with the 1550 nanometer signal such that cable 42A carries the TV signals in a downstream direction on 1550 nanometer light and carries telephony TCM signals in both directions on 1310 nanometer light. Of course, fiber optical cables 42B through 42E carry the 1550 nanometer light and the 1310 nanometer light in a similar manner.

At the remote downstream distribution terminals such as distribution terminal 20, and as will be discussed in detail later, the downstream traveling TV signals on the 1550 nanometer light are then recovered as TV signals having a band width of between 50 and 870 MHz (typically by a photo detector 57). They are then distributed to various locations including home or building 22 as was discussed with respect to FIGS. 1 and 2 above. In a similar manner, the bidirectional TCM signals traveling on 1310 nanometer light waves are routed to other equipment in distribution terminal 20 which recovers the electrical telephony signals by photo detectors—(PD) 59 from the 1310 nanometer light waves traveling downstream and uses the electrical telephony signals traveling upstream to modulate light waves having a wavelength of 1310 nanometers by laser diode—(LD) 61. The electrical telephony signals are then distributed from distribution box 20 by twisted wire pair 32B to the telephone 30B or other telephony equipment such as the 56K telephone modem 34 at home or building 22.

As was discussed with respect to the system of FIG. 2 above, it may be desirable to transmit cable modem signals, set-top box signals or other types of television related control signals or "purchasing information" signals from the set-top box 28 or TV set 26 at building 22 back to the TV signal source location 10. As discussed earlier with respect to FIG. 2, since the downstream transmission of TV signals is substantially continuous, such return information will have to be carried upstream at a different frequency band such as 5–50 MHz on the copper cable 12B and on a wavelength different than 1550 nanometer on fiber optic cable 42A. Thus, in addition to the telephone service which travels on a wavelength of light of 1310 nanometers, distribution terminal 20 will also use the 5 to 50 MHz electrical TV related signals to modulate light having a wavelength of 1310 nanometers. This wavelength of light carrying the cable modem or return TV related signals are then combined with the telephone service also traveling at 1310 nanometers and the portion on the TCM cycle traveling from distribution terminal 20 to distribution terminal 18. After the 1550 nanometer light is separated from the 1310 nanometer light at distribution terminal 18, both the actual telephony signals and the cable modem or TV related control signals carried by the 1310 nanometer light are provided to the plurality of fiber optic cables 54A through 54D to the appropriate distribution terminals such as distribution box 52 where they are then extracted or recovered as the normal telephone electrical signals at 3 Mbps and the RF return signals at 5–42 MHz. The telephony signals and the RF return signals are then provided in a normal fashion to typical telephone equipment as well as to the TV equipment 12.

Although in the embodiment shown in FIG. 3, the modulation of light waves by electrical signals for both telephone service and for TV signals is shown occur at a remote distribution box 20, it will be appreciated that in the future it may be advantageous that a single fiber optic would be connected into a home or building 22 and the recovery of electrical signal from light and vice versa will take place in the building 22 itself as indicated by dotted line 22A.

Thus, there has been discussed to this point generalized concepts for a new and improved telephony and TV signal distribution systems.

Figure 4A:
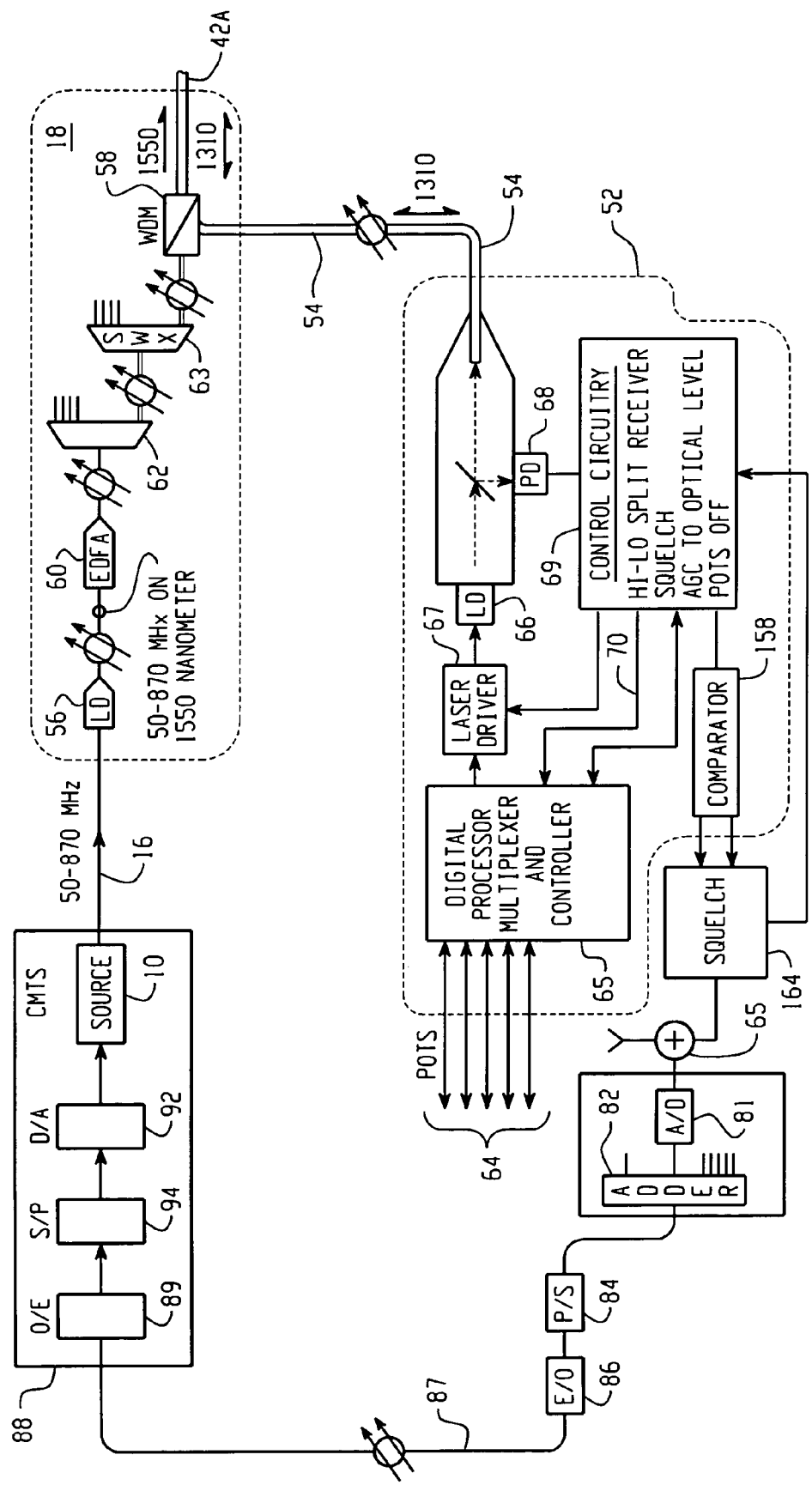
FIGS. 4A and 4B show detailed block diagram of the invention of FIG. 3.
Figure 4B:
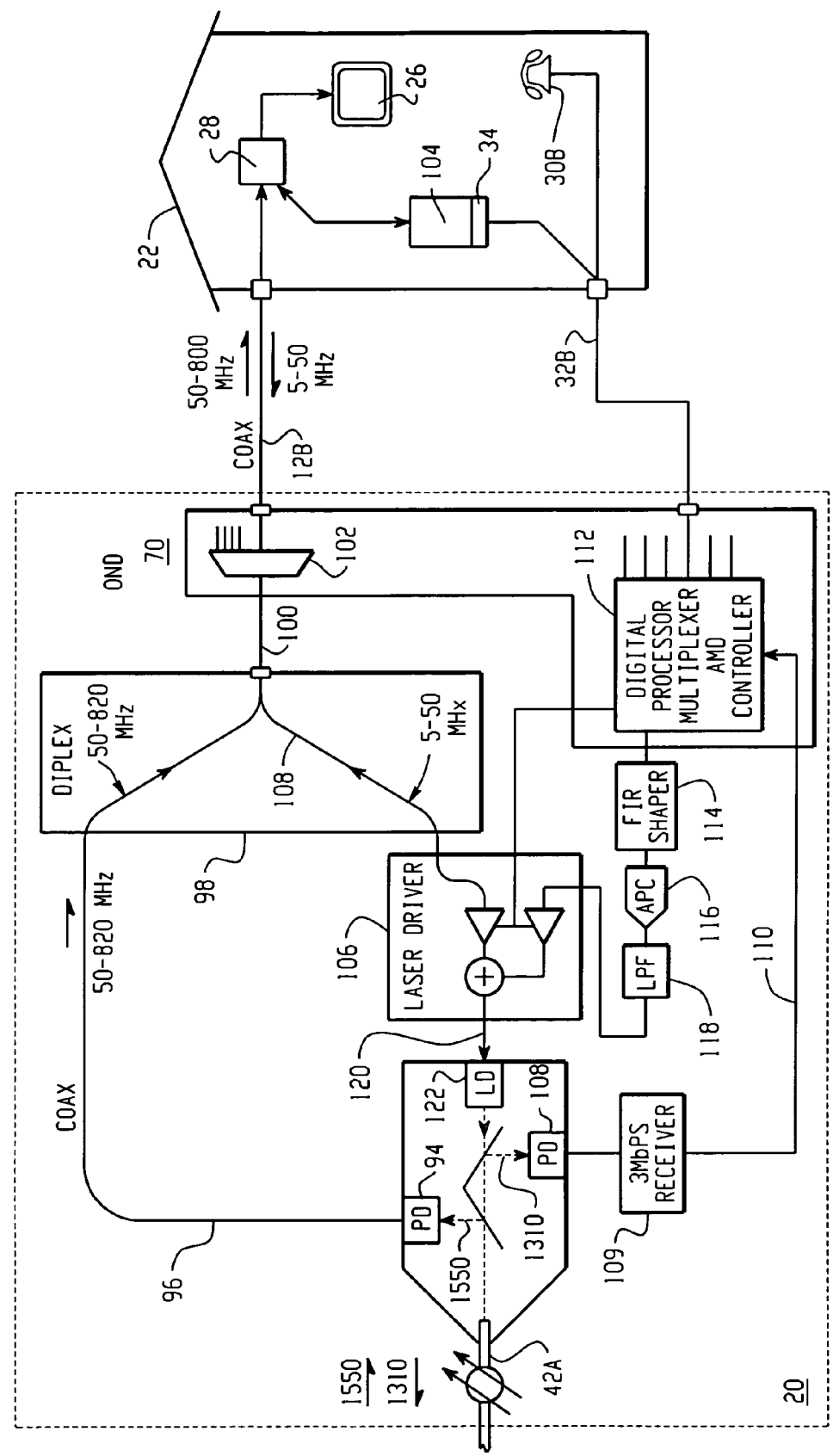

Referring now to FIGS. 4A and 4B, there is provided a more detailed description of the system of FIG. 3 discussed above. As shown, the TV signal source location 10 provides output TV signals at 50 to 870 MHz traveling downstream on copper wire 16. The electrical signals are then provided to laser diode 56 where the electrical signal at 50 to 870 MHz are used to modulate light having a wavelength of 1550 nanometers. The modulated 1550 nanometer light is then eventually provided to a plurality of WDM's (wave division multiplexers) such as to a WDM 58 which is also connected to optical fiber 54 carrying light at a wavelength of 1310 nanometers and will be discussed later. Although it is possible that the output of the light emitting diode 56 could be provided directly to a WDM 58, typically the light would go through at least one light amplifier such as EDFA (erbium doped fiber amplifier) 60. The amplified light signal from amplifier 60 would then typically pass the light through a first light splitting circuit 62 and then again perhaps to another light splitting circuit 63 such as a SWX circuit. The output of the splitter 63 would then be provided to the plurality of WDM's including WDM 58. As shown, the outputs of the plurality of WDM's such as WDM 58 are connected to a plurality of light fibers 42A through 42E.

Also as shown, multiplexed telephone service POTS at the DS 1 level (i.e. information from up to 24 TV customers) on copper wire 64 is provided to Digital Processor, Multiplexer and Controller 65 located in distribution box 52 wherein the electrical telephony signals then travel downstream typically with a speed of about 3 Mbps or 0 to 3 MHz (could be up to about 60 MHz) and are provided through a laser driver 67 to laser diode 66. These electrical signals are then used to modulate light generated by diode 66 having a wavelength of about 1310 nanometers. This modulated light is provided to optical fiber 54 as shown. Other POTS signals are similarly provided to optical fibers 54A through 54D and in turn to distribution terminal 18 and the appropriate WDM. As was discussed earlier, telephone service is typically TCM (time compression multiplexing) so as to provide for bidirectional communication at a single wavelength of light. Therefore as shown, light traveling upstream and leaving optical fiber 54 is directed toward a photo or a light detection diode 68 to provide an output to control circuitry 69 which receives the 1310 nanometer light and recovers the electronic signals having a frequency of about 60 MHz or less.

Figure 5:
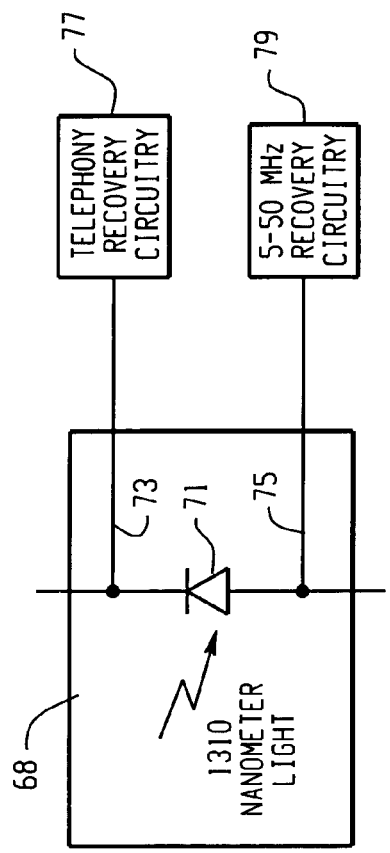
FIG. 5 illustrates how recovery circuits for different frequency bands can be connected one each to the anode and cathode of a photo diode to achieve high impedance separation.

In a preferred embodiment as shown in FIG. 5, a Hi-Lo Split Circuit connected to a photo diode 71 is used as the photo detector 68 and is connected such that the 3 Mbps (approximately 3 MHz) POTS signals can be taken from one of the cathode 73 or anode 75 sides of the diode 71 and the 5 to 50 MHz RF return or TV control signals can be taken from the other side. Thus, the high impedance of the diode 71 provides excellent separation between the two sets of signals such that the appropriate band pass filter may be significantly simplified. The upstream 3 Mbps POTS signals are then provided to processor and controller circuitry 65 on line 70, while the 5 to 50 MHz TV related control signals are provided on line 72 to combining cross-connect circuit 80 where inputs from other similar controller circuits are combined prior to being provided to A/D converter 81. In the embodiment shown in FIG. 5, recovery circuitry 77 is connected to cathode 73 and recovers the telephony signals below 3 MHz. Recovery circuitry 79 is connected to anode 75 and recovers the RF return signals having a frequency band of between about 5–50 MHz. It will be appreciated having the circuitry connected to the anode could recover the telephony signals and the circuitry connected to the cathode could recovery the 5–50 MHz RF return signals.

Thus, the input electrical telephone signals to laser diode 66 from line 64 through circuitry 65 and laser diode 67 and the output electrical telephony signals from light detection diode 68 and Hi-Lo split receiver circuit in Processing Circuitry 69 on line 70 actually represent a typical pair of wires used in normal POTS telephony service. The 5–50 MHz on line 72 as mentioned above, is then provided to RF combine cross-connect circuitry 80 which receives other similar signals from other TV customers up to a total of at least 16 (8+8) customers. The output of combine cross-connect circuitry 80 may then be provided to an 8 bit 90 MSPS (megsamples per second) analog-to-digital converter 81. However, it will be appreciated by those skilled in the art that the A/D converter 81 may not be necessary in which case the signals would continue as analog signals. The digital signals from A/D converter 81 are then provided to a 90 MHz 8 bit to 12 bit adder 82. Adder 82 as shown can receive the output from 8 A/D converters such as A/D converter 82. Thus, it will be appreciated that the output from adder 82 going to the parallel to serial converter 84 will be carrying information related to at least 128 TV customers (16×8). The output of the P/S converter 84 may then provided to another E/O (electrical-to-optical) device 86 operating at 1 Gbps (giga bit per second). This output may then be transmitted by optical fiber 87 to CMTS (cable modem transmission source) at location 88 where the TV signal source 10 is also located. The light traveling through optical fiber 87 is then received by O/E (optical-to-electrical) converter 89 and the resulting electrical signals are provided to S/P (serial-to-parallel) converter 90. This parallel digital information is then provided to D/A converter 92, which in turn provides an analog signal to the TV signal source 10. This analog signal may of course be a control signal or other information related to a specific TV customer or subscriber.

Referring now to FIG. 4B, optical fiber 42A is shown being received at distribution panel 20. As shown optical fiber 42A is carrying television signals in one direction (downstream) by light having a wavelength of 1550 nanometers at the same time it carries bidirectional telephone communications using TCM (time compression multiplexing) by light having a wavelength of 1310 nanometers. As shown, the light having a wavelength of 1550 nanometers is directed towards a photo detector 94 which recovers and extracts the electrical television channel signals having a band width of between 50 and 870 MHz. These electrical television signals are then provided by coaxial cable 96 to a diplex circuit 98 which has an output 100 provided to splitting circuit 102. Also as shown and as will be discussed hereinafter diplex circuit 98 also separates out electrical signals having a frequency of between 5 and 50 MHz traveling in the opposite direction. One of the outputs of splitter or distribution circuit 102 carrying the 50 to 870 MHz electrical signals will then be provided to building or house 22 by means of coaxial cable 12B in the manner previously discussed. The television signals on coaxial cable 12B are then either provided directly to TV set 26 or to another TV-signal using device such as set-top box 28, and then to TV set 26. Also, in the building 22 there is shown a computer 104 connected to a computer telephone modem 34 as was discussed heretofore with respect to FIG. 1 and which is also connected to the standard telephone lines or POTS lines 32B. Also as shown, a telephone 30B is connected to the POTS lines 32B. The RF return such as cable modem or TV related signals sent back to the TV source location 10 may result from several sources. One possible source is for the set-top box 28 to sense that the television signals being received need to be either decreased or increased in amplitude or strength. Alternately, it may be that the customer or user of the television decides to purchase a particular pay-on-demand movie. Still another source of information may be an input from the computer 104 provided to the set-top box carrying information or requesting information, or the computer 104 may include a cable modem which sends signals upstream on coaxial cable 12B. Such information must be provided back to the TV source location 10. The cable modem or the set-top box 28 (as example only) will convert the information into an electrical signal having a frequency band of between 5 and 50 MHz which is inserted on coaxial cable 12B and transmitted to distribution terminal 20. It will be appreciated that coaxial cable 12B can carry information in both directions if the frequency band for the two directions is sufficiently separated. The 5–50 MHz television related signals are then routed to the diplex circuitry 98 where the electrical signals having a frequency band of 5 to 50 MHz are split out and provided to a laser driver circuit 106.

Now referring again to the input cable 42A which, in addition to carrying light having a wavelength of 1550 nanometers downstream as was previously discussed, is also carrying light at 1310 nanometers downstream for the bidirectional telephone communication using TCM (time compression multiplexing). Thus, the light having a wavelength of 1310 nanometer is provided to a photo detector 108 which along with receiver 109 recovers the downstream telephony electrical signals from the 1310 nanometer light traveling downstream and inserts them on wires 110. These telephony electrical signals will typically be POTS signals at the DS1 (up to 24 customers) or DS2 (up to 96 customers) level and are provided to the Digital Processor Multiplexer and Controller 112 and eventually by means of wires 32B to the telephone circuitry in house or building 22. It should be appreciated that the wire 32B connecting home 22 to the distribution panel 20 is a normal twisted pair of telephone wires. The upstream traveling POTS service travels on wire 32B, through Digital Processor and Controller 112 to POTS signal shaping circuit 114, and through APC circuitry 116, and low Pass Filter 118 to Laser Drive Circuitry 106 where it is combined with the 5 to 50 MHz signals and provided on output line 120 to a laser diode 122. Laser diode 122 then uses the electrical signals carrying the 5 to 50 MHz television related signals as well as the telephony signals (0–3 MHz) to modulate light having a wavelength of 1310 nanometers which light is then coupled again to optical fiber 42A. Thus, as was discussed earlier, the fiber optic 42A carries the upstream traveling 1310 nanometer light to distribution panel 18 which also receives 1310 nanometer light from a plurality of similar optical fibers. Distribution terminal 18 then directs the 1310 nanometer light to distribution box 52 where it is split out for both telephony service and television related signals.

Also included is a monitor or photo detection diode 124 coupled to laser diode 122 for providing an indication of signal strength back to Digital Processor, Multiplexer and Controller 112 as indicated by connecting line 125.

As shown in FIG. 4B, a large number of user locations such as home 22 are connected to distribution terminal 20 for both the 5–50 MHz RF return signals (via coax cable 12B for home 22) and POTS signals (via twisted pair 32B for home 22). It will be appreciated that the RF return signals may include various type of signals such as cable modem signals, set-top box signals, etc. However, for consistency the following discussion assumes that the RF return signals are cable modem signals. It will be appreciated that although the various user locations may be at somewhat different distances from distribution terminal 20, the signal strength of the return or upstream TV related control signals and the POTS signals traveling upstream are controlled by Digital Processor, Multiplexer and Controller 112 such that the signal strength of the signals received at distribution terminal 20 are at substantially the same value.

Figure 6:
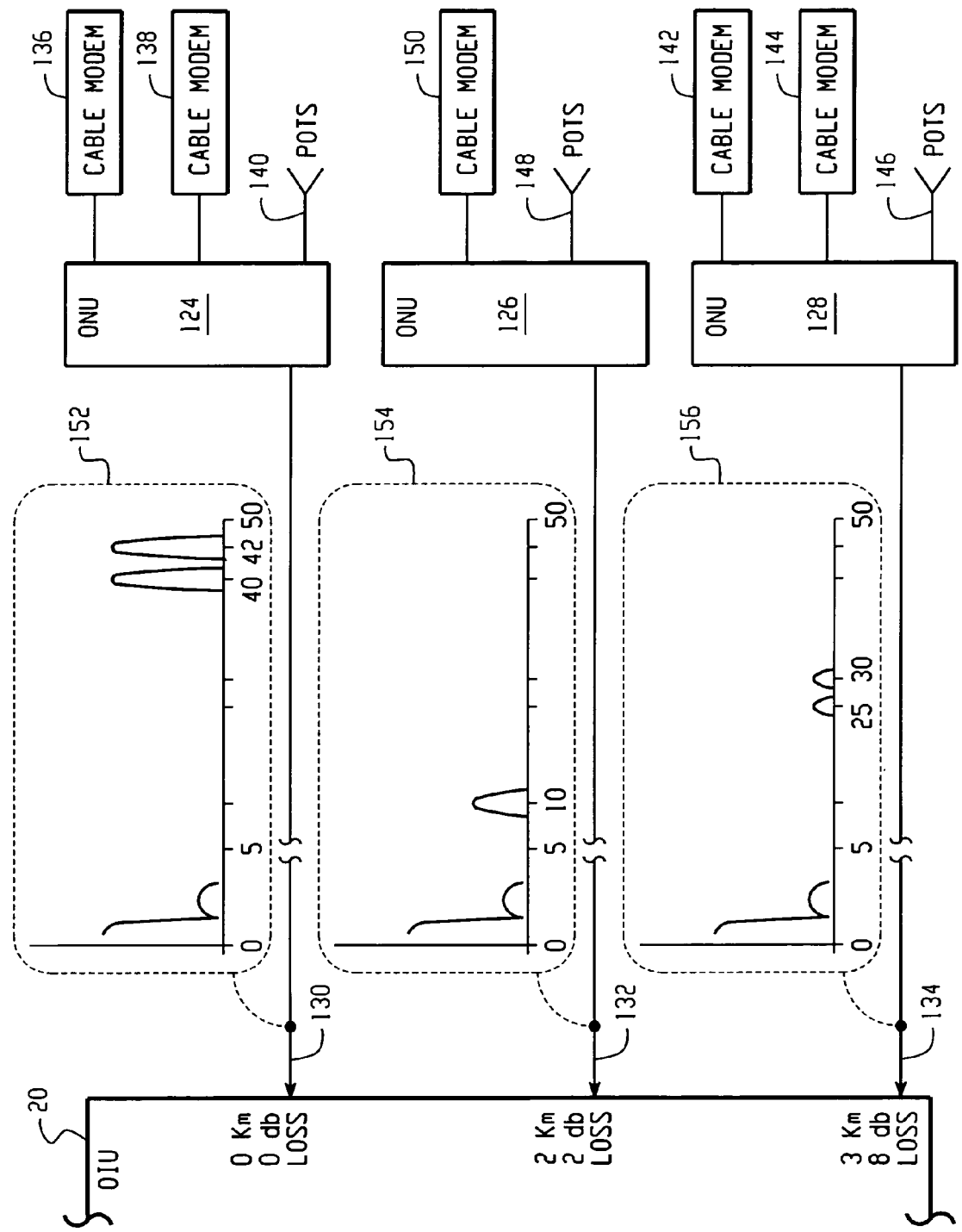
FIG. 6 is a schematic representation of RF return signals having different optical power loses between "ONU's" (Optical Network Units) at various locations and an HDT distribution terminal.

Unfortunately, controlling the signal strength received from the optical fibers is not as straightforward. Therefore, according to the present invention and referring now to FIGS. 6 and 7, there is shown an example of three different remote distribution terminals such as terminal 20 and how they feed into terminal 18 and then to the signal processing circuitry 69 in distribution box 52. FIG. 6 also includes graphs showing the corresponding signal strength of the individual optical signals when there is no regulation or processing of the signals. According to FIG. 6, there are shown three remote distribution terminals 20, 126 and 128 (commonly called optical network units or ONU's) connected by optical fiber cables 42A, 42C and 42D respectively to distribution terminal 18. It will be appreciated of course that more than three remote distribution terminals could be connected to distribution terminal 18 and in practice distribution terminal 18 may receive signals from up to 84 ONU's. Also in the example shown, ONU 20 receives signals from two cable modems 136 and 138 as well as POTS signals on line 140. Typically, cable modems 136 and 138 and the POTS signals on line 140 will be from user locations which are in close physical proximity with each other. Consequently, the signal loss between the physically close locations and the ONU 20 is similar such that the strength of the various signals arriving at ONU 20 are at substantially the same level. In practice, there may be up to 24 user locations per ONU. In a similar manner, substation 128 is also shown as receiving cable modem signals generated by cable modems 142 and 144 along with POTS signals on line 146, all from physically close user locations. Substation 126, however, is shown as receiving POTS signals on line 148 and a signal from the single cable modem 150.

In the example of FIG. 6, ONU or substation 20 is shown as being zero kilometers from (that is located adjacent to) distribution terminal 18 such that the optical signals see substantially no signal loss (i.e., zero (0) db loss). Substation 124 on the other hand is illustrated as being two kilometers away from distribution terminal 18 and has a two (2) db loss of optical signal strength whereas substation 126 is illustrated as being three kilometers away from distribution terminal 20 with a corresponding eight (8) db loss of signal strength. Thus, the breakout graph 152 of signals arriving at distribution terminal 18 on line 42A shows two (2) relatively strong signals which have a center frequency of about 40 and 42 MHz. It will appreciated that the two center frequencies of around 40 and 42 MHz are examples only to aid in the understanding of the circuitry of this invention and that the actual center frequencies could be any value between 5 MHz and 50 MHz. The actual center frequencies are determined and controlled by the CMTS (cable modem terminal system) 88 shown in FIG. 4A. Breakout graph 154 shows a single cable modem signal having a center frequency around 10 MHz and which has reduced signal strength when compared with the signal strength of that shown in breakout graph 152. Similarly, breakout graph 156 shows a pair of cable modem signals having center frequencies of around 25 and 30 MHz and which have significantly reduced signal strength.

Figure 7:
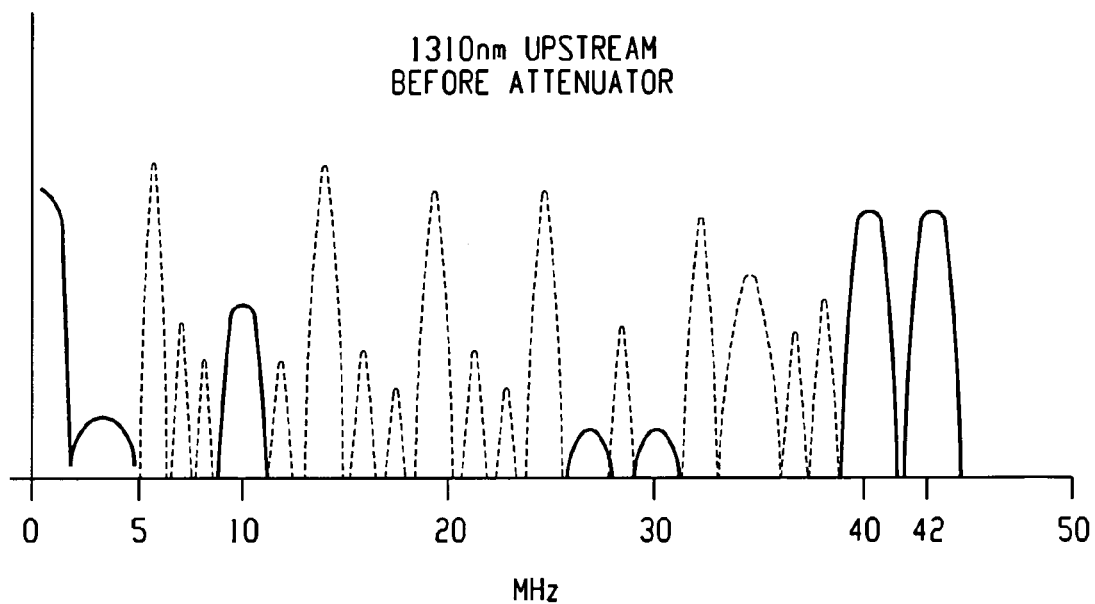
FIG. 7 is a composite graph of the RF return signal spectrum with signals arriving at a common distribution terminal having different levels of optical power loss, including those shown in FIG. 6.

FIG. 7 illustrates the relative strength of the five different cable modem signals in a single graph. Thus, it is clear that if the full frequency band between 5 to 50 MHz was amplified by a single broad band amplifier and then transmitted upstream to distribution terminal 18, the signals at 40 and 45 MHz would be unnecessarily amplified while the signals at 25 and 30 MHz may well be under amplified. The signals indicated by dotted lines in FIG. 7 shows how the signal strength of a full composite of modem signals extending across the 5 to 50 MHz frequency band could vary.

Further, it is not effective to simply sample the signals periodically and then adjust their level prior to being provided to cross-connect circuitry 80 or adder 82, since the occurrence of RF return signals is very intermittent, unpredictable and certainly not continuous. Consequently, the system would likely try to sample and set a signal level for transmission when there was no signal present. This would result in the power level being set a maximum as the system tries to amplify a non-existing signal to a predetermined level. Consequently, the only thing which would be amplified and transmitted would be any noise generated by the system or which happened to be picked up by the transmission between the user location and distribution terminal 18.

Figure 8:
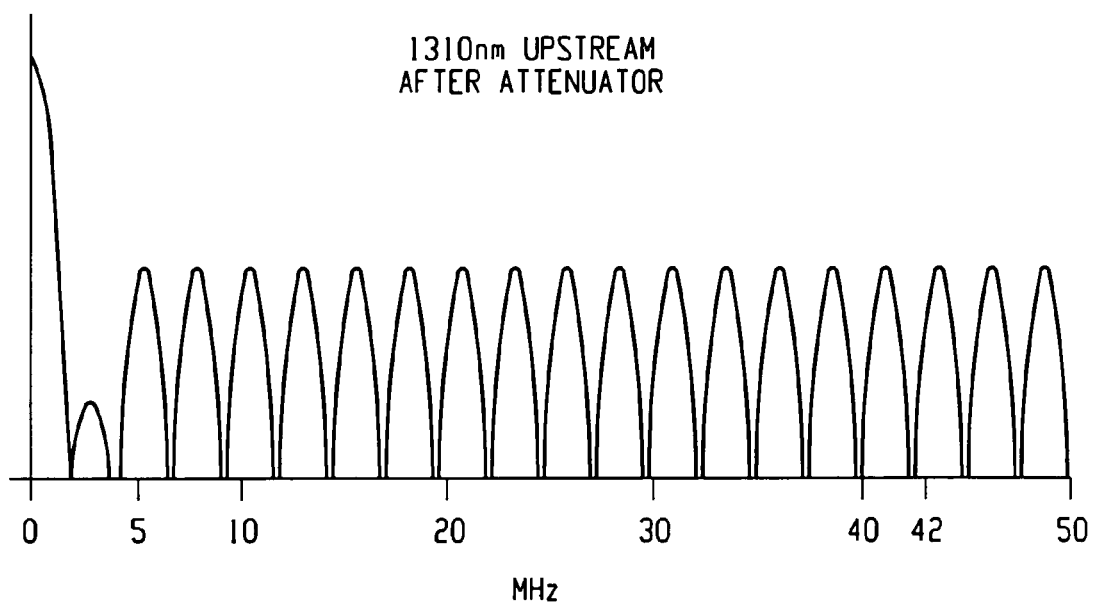
FIG. 8 is a composite graph of the RF return signal spectrum of FIG. 6 where all of the individual signals have been attenuated so as to have a constant power level.

It will be appreciated by those skilled in the art, however, that the POTS signals received by control circuitry 69 are always present and are regulated by controller 112 to always have at least a one volt peak to peak value. Therefore, according to the present invention, each of the received POTS signals from the various remote distribution terminals are sampled at control circuitry 69. All of the POTS signal are then individually attenuated as necessary so that they all are set at the predetermined level of one volt peak to peak signal (or base band) reference level. Since the power loss experienced by the POTS signals and the cable modem signals will be substantially the same, the amount of attenuation of each POTS signal is then used to attenuate the corresponding RF return signals returning from the same remote location. FIG. 8 illustrates the constant level signals after all of the signals have been appropriately attenuated. These constant power level signals can then be used to maintain the end to end power losses at 20 DB.

Referring again to FIG. 4B, there is also included a FIR or digital filter 114 used for shaping the frequency content of the POTS or base band signal prior to transmission so as to keep the signal below 3 MHz such that the signal will not interfere with the RF signals. Then, by using an NRZ (non-return to zero) output at distribution terminal 18, the POTS digital signals representing the POTS signals can be extracted and the original shape of the analog POTS signal substantially recreated.

It will also be appreciated, that even if the full spectrum of RF return signals between 5 MHz and 50 MHz are assigned, the usage of these signals is so limited that there may be periods of time when there are no RF return signals anywhere across the spectrum. In such an event it is not desirable for the circuitry in distribution terminal 18 (FIG. 4A) to try to amplify the frequency spectrum which carries these signals to a preset level since only noise would be amplified and evaluated as to content. Therefore, as shown in FIG. 4A there is also included a comparator circuit 158 which periodically samples the received 5 MHz to 50 MHz RF spectrum before any amplification and compares the received RF signal to a predetermined threshold level and provides one or more threshold outputs as indicated on lines 160 and 162. If the non-amplified signal is below a certain level, squelch circuitry 164 operates as though no actual RF signals are present and sends an appropriate control signal to control circuitry 69 to prevent further transmission and/or reception of the RF signal until the next sample period. If the received power level is above the preset threshold, the circuitry operates as though actual signal content is present and sends the appropriate control signal to enable further reception and processing of the RF signals. As mentioned above, more complex squelch circuits may compare the received signals against two (2) threshold levels.

Likewise, referring to FIG. 4B, it is desirable to have the signal strength of both the 0–3 MHz POTS signals and 5 MHz to 50 MHz RF return signals remain proportional to each other and the overall laser power output level from LD 122. To accomplish this, it is necessary to control the gain of both the 5 MHz to 50 MHz RF return signal amplifier 166 and the 0–3 MHz telephony signal amplifier 168. However, as discussed above, the RF return signals only occur very infrequently and therefore any attempt to sample the output of amplifier 166 and provide a typical feedback or gain control would include taking samples when there were no RF return signals present such that only the noise would be amplified. Therefore, as mentioned above, photo detection diode 124 is coupled to a laser diode 122 and is used to extract and monitor the signal strength of only the telephony signal which is always on. This signal strength indication is then provided to Digital Processor Multiplexer and Controller 112.

Since variations in proportional signal strength to laser power output will typically be the same for both the telephony amplifier 168 and the RF return amplifier 170, controller 112 can provide the same control signal on line 170 to both amplifier 166 and 168 in Laser Driver 106. This technique maintains excellent control of both the telephony and RF control signals as a proportion of the output laser power.

Thus, there has been discussed to this point a new and novel communication transmission system using a single optical fiber as part of the communication path along with parts of an existing telephone communication system and parts of an existing cable TV distribution system.

The corresponding structures, materials, acts, and equivalents of all means or step plus function elements in the claims below are intended to include any structure, material, or act for performing the function in combination with other claimed elements as specifically claimed.

I claim:

1. A method of providing first RF signals within a first frequency band from a first location to a multiplicity of second locations, providing bidirectional telephony signals between said first location and at least two of said multiplicity of second locations, and providing second RF signals within a second frequency band from said at least two second locations to said first location on at least two separate optical paths and comprising:

transmitting light at a first wavelength modulated by said first RF signals from said first location to at least two intermediate locations via said at least two separate optical paths and from each of said at least two intermediate locations to said multiplicity of second locations on a multiplicity of first paths, each having at least two electrical conductors;

bidirectionally transmitting light at a second wavelength for carrying telephony signals both upstream and downstream on said at least two optical paths between said first location and said at least two intermediate locations and from said at least two intermediate locations to said second locations on a multiplicity of second paths having at least two electrical conductors;

transmitting first and second RF signals at selected frequencies within a second frequency band from at least two of said multiplicity of second locations one each to said at least two intermediate locations on at least two of said multiplicity of first paths;

further modulating said transmitted light having said second wavelength traveling from said at least two intermediate locations to said first location on said at least two optical paths with said first and second RF signals from said at least two second locations; and receiving said first and second RF signals within said second frequency band at said first location;

receiving said light having said second wavelength at said first location traveling from a first one of said at least two intermediate locations on a first one of said at least two optical paths;

receiving said light having said second wavelength at said first location traveling from a second one of said at least two intermediate locations on a second one of said at least two optical paths;

recovering and attenuating first telephony signals received from light carried by said first one of said at least two optical paths by a first amount such that said first telephony signals are substantially at a preset value;

recovering and attenuating second telephony signals received from light carried by said second one of said at least two optical paths by a second amount such that said second telephony signals are also substantially at said preset value; and recovering and attenuating said second RF signals traveling to said first location on said first one and said second one of said at least two optical paths by said first and second amounts respectively such that each of said attenuated second RF signals have substantially the same signal strength.

2. The method of claim 1 and further comprising:

comparing the strength of recovered second RF signals within said second RF frequency band to a preset threshold; and inhibiting further transmission of said RF signals within said second RF frequency band if said compared signals are not equal to or greater than said preset threshold.

3. The method of claim 2 wherein recovering said second RF signals from said light waves comprises:

receiving light traveling upstream and having said second wavelengths from said at least two optical paths by a photo diode having an anode and a cathode;

recovering said second RF signals at one of said anode and cathode of said photo diode; and recovering telephony signals at the other one of said anode and cathode of said photo diode.

4. Communication apparatus comprising:

a source for generating first RF signals at a first frequency band and adapted for distribution to a multiplicity of users;

at least two transmission paths between a first location having said source and a least two of said multiplicity of users at least two second locations, at least a portion of each at least two transmission paths being optical;

a first light generator for generating light at a first wavelength of light, said light being modulated to carry said first RF signals within said first frequency and on said optical portions of said transmission path;

at least two pairs of second light generators one each of each pair located at an end of said optical portions of said at least two transmission paths and each second light generators for generating light at a second wavelength modulated to carry bidirectional telephony signals traveling between said first and said at least two second locations on said optical portions of said at least two transmission paths;

second and third RF signals within a second frequency band generated at the two second locations and carried to said source one each on said at least two transmission paths by modulating said light having said second wavelength;

an attenuator for attenuating first telephony signals recovered from the optical portion of a first one of said at least two transmission paths by a first amount such that said first telephony signals are at a preset value;

an attenuator for attenuating second telephony signals recovered from the optical portion of a second one of said at least two transmission paths by a second amount such that said second telephony signals are at said preset value; and attenuators for attenuating said second and third RF signals recovered from the optical portions of said first and second transmission paths respectively such that each of said attenuated second and third RF signals have substantially the same signal strength.

5. The communication apparatus of claim 4 wherein at least one of said photo detectors is a photo diode having a cathode and an anode, and wherein said second RF signals are recovered at one of said anode and a cathode and said telephony signals are recovered at the other one of said anode and cathode.

6. The communication apparatus of claim 4 wherein said RF signals within said first frequency band have a frequency of between about 50 and 870 MHz.

7. The communication apparatus of claim 6 wherein said second and third RF signals within said second frequency band have a frequency of between about 5 and 50 MHz.

8. A method of providing first RF signals within a first frequency band from a first location to a multiplicity of second locations, providing bidirectional telephony signals between said first location and at least two of said multiplicity of said second locations, and providing second RF signals within a second frequency band from said at least two second locations to said first location on at least two separate optical paths and comprising:

transmitting light at a first wavelength modulated by said first RF signals from said first location to at least two intermediate locations via said at least two separate optical paths and from each of said at least two intermediate locations to said multiplicity of second locations on a multiplicity of first paths, each having at least two electrical conductors;

bidirectionally transmitting light at a second wavelength for carrying telephony signals both upstream and downstream on said at least two optical paths between said first location and said at least two intermediate locations and from said at least two intermediate locations to said second locations on a multiplicity of second paths having at least two electrical conductors;

transmitting first and second RF signals at selected frequencies within a second frequency band from at least two of said multiplicity of second locations one each to said at least two intermediate locations on at least two of said multiplicity of first paths;

further modulating said transmitted light having said second wavelength traveling from said at least two intermediate locations to said first location on said at least two optical paths with said first and second RF signals from said at least two second locations; and receiving said first and second RF signals within said second frequency band at said first location;

amplifying at least one of said first and second RF signals within said second frequency band;

amplifying the telephony signals traveling upstream, and amplification of said RF signals and said telephony signals occurring prior to said signals modulating said second wavelength of light;

monitoring the signal strength of said amplified upstream telephony signals as a proportion of the modulated light having said second wavelength and generating a control signal therefrom; and adjusting the amplitude level of said RF signals and said upstream telephony signals in response to said generated signal.

9. Communication apparatus comprising:

a source for generating first RF signals at a first frequency band and adapted for distribution to a multiplicity of users;

at least two transmission paths between a first location having said source and at least two of said multiplicity of users at least two second locations, at least a portion of each of said at least two transmission paths being optical;

a first light generator for generating light at a first wavelength of light, said light being modulated to carry said first RF signals within said first frequency and on said optical portions of said transmission path;

at least two pairs of second light generators one each of each pair located at an end of said optical portions of said at least two transmission paths and each second light generators for generating light at a second wavelength modulated to carry bidirectional telephony signals traveling between said first and said at least two second locations on said optical portions of said at least two transmission paths;

second and third RF signals within a second frequency band generated at the two second locations and carried to said source one each on said at least two transmission paths by modulating said light having said second wavelength;

a first amplifier to amplify the upstream telephony signals and a second amplifier to amplify the RF return signals, said first and second amplifier providing electrical signals to modulate light at said second wavelength traveling upstream;

a photo diode located at said at least one of said at least two second locations for monitoring the corresponding one of said pair of second light generators;

circuitry connected to said photo diode to provide a control signal representative of the upstream telephony signal strength as a proportion of the output power of said one of said pair of second light generators; and said control signal connected to said first and second amplifiers for controlling the output signal strength of said first and second amplifier as a selected proportion of said light output at said second wavelength.

* * * * *